United States Patent [19]

Truhan et al.

[11] 4,246,013
[45] Jan. 20, 1981

[54] CYCLONE TYPE AIR/PARTICULATE CONCENTRATOR AND COLLECTOR

[76] Inventors: Andrew Truhan, P.O. Box 467, Granite Falls, N.C. 28630; William R. Haynes, Rte. 1, Box 127, Taylorsville, N.C. 28681

[21] Appl. No.: 96,488

[22] Filed: Nov. 21, 1979

[51] Int. Cl.³ .............................................. B01D 45/12
[52] U.S. Cl. ........................................ 55/340; 55/435; 55/459 B; 55/460; 55/415; 209/144
[58] Field of Search ............. 55/459 A, 459 B, 459 C, 55/459 D, 460, 413–416, 338–340; 209/144

[56] References Cited

U.S. PATENT DOCUMENTS

| | | | |
|---|---|---|---|
| 566,357 | 3/1896 | Marshall | 55/460 |
| 815,966 | 3/1906 | Lynch | 55/459 R |
| 1,288,126 | 12/1918 | Muller | 55/414 |
| 1,344,146 | 6/1920 | Peck . | |
| 1,344,585 | 6/1920 | Hewitt et al. | 55/459 R |
| 1,408,693 | 3/1922 | Deily | 55/339 |
| 1,616,566 | 2/1927 | Barker | 209/143 |
| 1,882,329 | 10/1932 | Kreisinger | 55/345 |
| 2,010,128 | 8/1935 | Arnold . | |
| 2,074,818 | 3/1937 | Watson | 55/458 |
| 2,085,506 | 6/1937 | McKeown | 55/460 |
| 2,153,270 | 4/1939 | Osgood | 55/339 |
| 2,583,696 | 1/1952 | Held et al. | 55/459 R |
| 2,684,232 | 7/1954 | Caldwell . | |
| 3,902,601 | 9/1975 | Townley | 209/144 |

Primary Examiner—Bernard Nozick
Attorney, Agent, or Firm—Kerkam, Stowell, Kondracki & Clarke

[57] ABSTRACT

A cyclone vortex type air cleaner and particulate concentrator is provided having greatly improved air cleaning efficiency as the dirty gas stream is subjected to two distinct skimming operations; one between the gas inlet scroll and the outlet tube and the other at the exit from the gas discharge scroll. The invention may further include means for increasing agglomeration of the particulate by increasing centrifugal separation in an inlet scroll, an outlet scroll and in the outlet tube from the shell or body of the cyclone.

4 Claims, 6 Drawing Figures

CYCLONE TYPE AIR/PARTICULATE CONCENTRATOR AND COLLECTOR

DESCRIPTION

1. Technical Field

This invention relates to a cyclone type air or gas cleaner and particulate concentrator having particulate recirculating means to improve the partical collecting efficiency without materially increasing pressure drop over less efficient collectors of the prior art.

2. Background of Prior Art

Cyclone type collectors are well known in the art, including types having partical skimming means, and inlet and outlet scrolls or volutes. Further it is known to provide cyclone type collectors with passages between the gas inlet and the outlet tube. Exemplary of such prior art are U.S. Pat. Nos.: 815,966 Lynch, 1,344,146 Peck, 1,408,693 Deily, 1,616,566 Barker, 2,074,818 Watson, 2,085,506 McKeown, 2,583,696 Held et al, 3,902,601 Townley.

BRIEF SUMMARY OF INVENTION

The present invention may be summarized as a cyclonetype particulate collector and concentrator having a cylindrical body portion with a conical lower particulate material outlet tube. Dirty gas enters the collector through an inlet volute at the upper end of the cylindrical body portion through which a gas outlet tube projects and terminates in the cylindrical body portion. The upper end of the outlet tube communicates with an outlet volute having an adjustable skimmer plate pivotly mounted in the gas outlet volute and so positioned to separate the outlet gas stream into two streams differing in suspended particle concentration.

The collector of the invention also includes an adjustable passage between the gas outlet tube and the dirty gas inlet volute, and a plastic liner may be provided for the gas outlet tube.

BRIEF DESCRIPTION OF THE DRAWING

The invention will be more particularly described in reference to the accompanying drawings wherein.

DETAILED DESCRIPTION OF INVENTION

Figure 1:
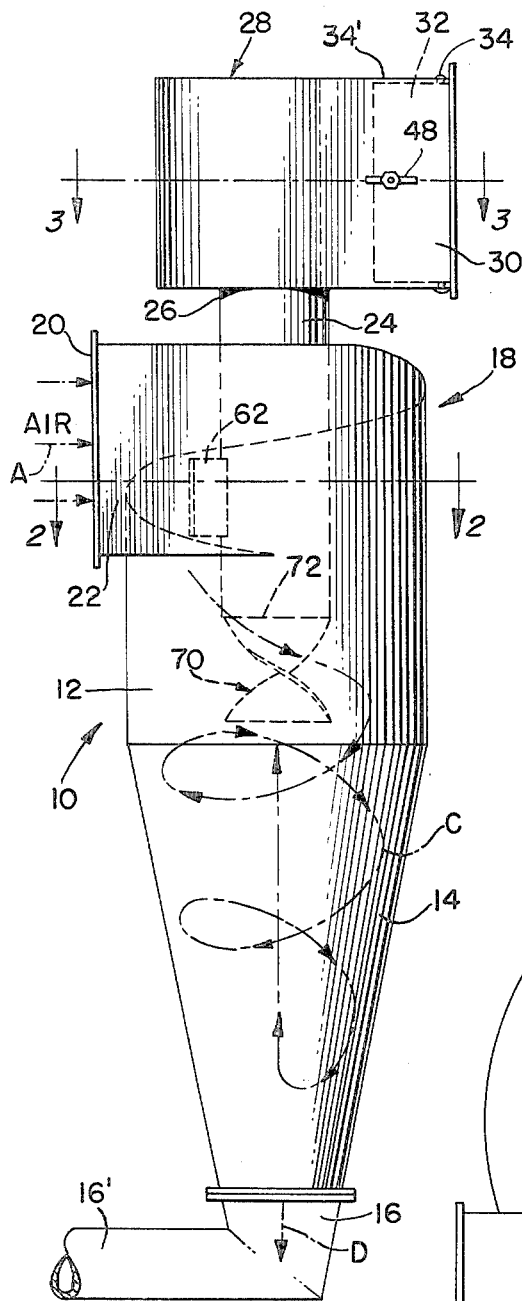
FIG. 1 is a vertical sectional view of one form of the cyclone-type particle concentrator and collector of the invention.
Figure 2:
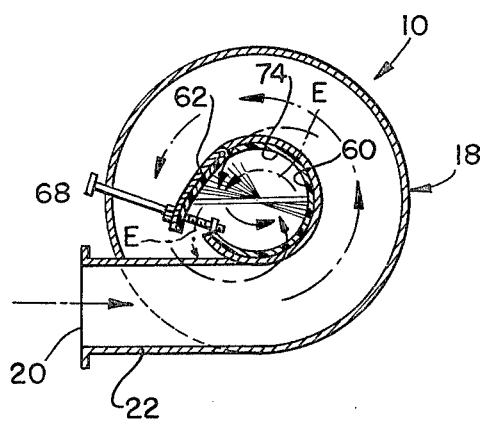
FIG. 2 is a section on line 2—2 of FIG. 1.

Referring to the drawings and, in particular, FIGS. 1 through 4, 10 generally designates one embodiment of the improved cyclone-type particle concentrator and collector.

The collector 10 includes a cylindrical body portion 12 having a conical particulate material outlet portion 14 depending therefrom. The discharge from the lower end of the cone, as at 16, may be connected to suitable particulate material collection hoppers and the like as is well known in the art.

Figure 6:
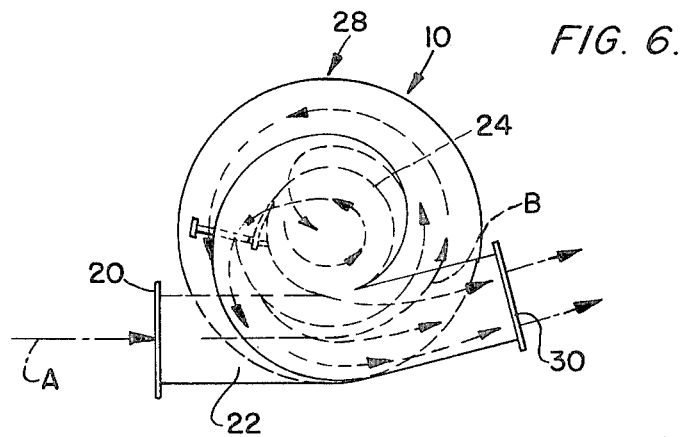
FIG. 6 is a diagrammatic view illustrating flow arrows in the inlet and outlet vortex and the outlet tube.

The upper end 18 of the cylindrical housing 12 is in the form of a helix, scroll or volute to provide a zone within which the dirty air entering the inlet 20 of the volute 22, as illustrated by directional arrow A, obtains its initial swirling action as depicted by arrow B, FIG. 6 of the drawing. Extending through the helical top 22 is a cyclone vortex outlet type 24 of generally cylindrical configuration. The upper end 26 of the vortex outlet tube 24 is in open communication with a second volute or scroll outlet element 28, which outlet scroll as more clearly indicated in FIG. 3 directs the outlet air in an increasing area passage to thereby convert the velocity of the gas stream tube pressure recovering some of the pressure drop of the gas stream through the concentrator/collector.

Figure 3:
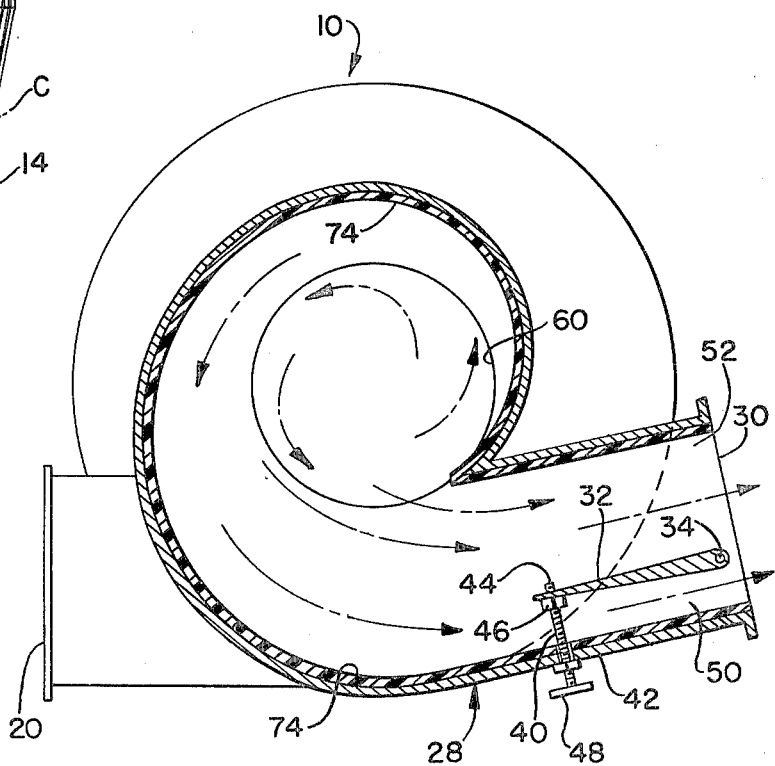
FIG. 3 is a section on line 3—3 of FIG. 1.
Figure 4:
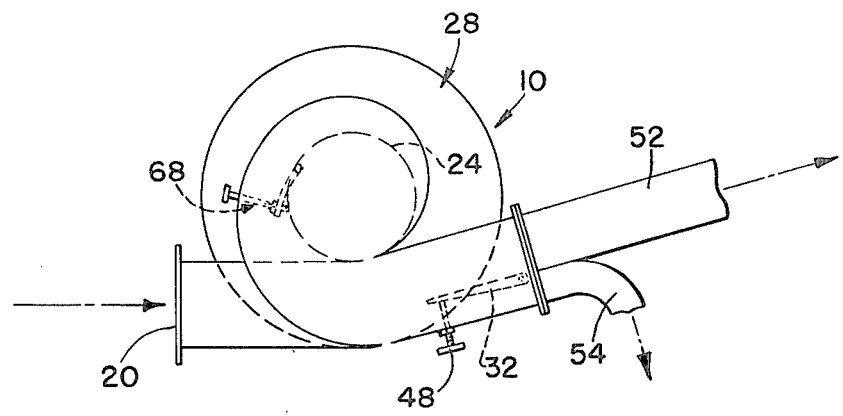
FIG. 4 is a top plan view of the collector illustrated in FIG. 1.
Figure 5:
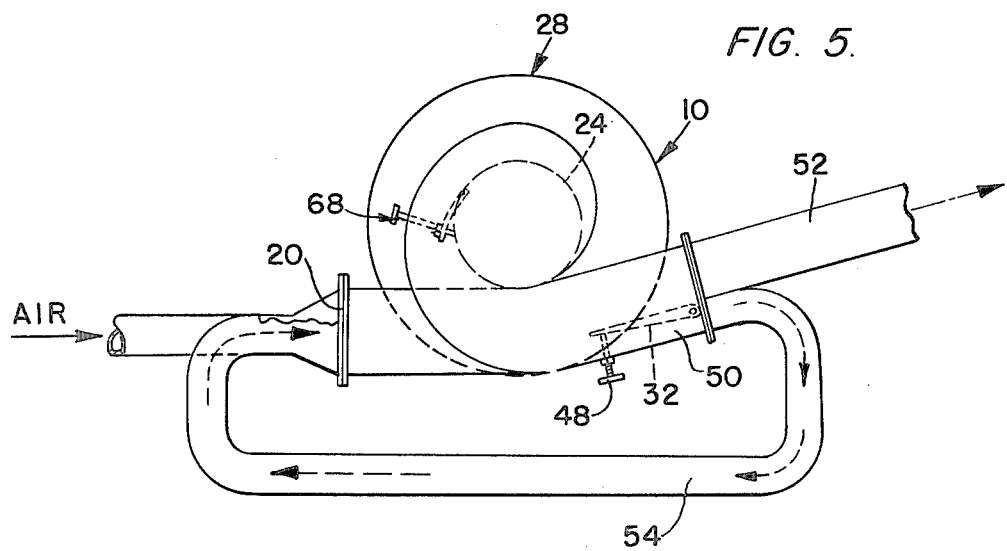
FIG. 5 is a view like FIG. 4 illustrating return of the dirtier vortex air to the air inlet of the collector.

As more clearly shown in FIG. 3, adjacent the outlet 30 from the upper outlet volute 28 is mounted an adjustable partition 32. The adjustable partition 32 is hinged as at 34 to the upper and lower closure plates 34' and 36 of the outlet volute 28. Positioning of the adjustable gate or skimmer plate 32 is via a threaded shaft 40, rotatably mounted in wall 42 of the upper volute. The inner end 44 of the threaded shaft 40 is in threaded engagement with a follower nut 46 mounted to move with the plate 32, whereby, upon rotation of the shaft 40 via handle 48 the position of the leading edge of the skimmer plate 32 relative to wall 42 is carried out. Again it will be noted from FIG. 3 that the air movement in the volute or scroll 28 is such that particulate material in the gas stream is forced by centrifugal force outwardly, and the portion of the air carrying any particulate material may be skimmed from the remainder of the air so that two outputs 50 and 52 are provided for the concentrator. The dirtier vortex air issuing from outlet 50 may be re-directed to the inlet 20 of the collector concentrator via conduit 54, whereas, the substantially particle free vortex air issuing from conduit 52 may be directed back into the body of air in, for example, the factory from which the inlet air is derived.

Exemplary of the operation of a particle collector concentrator as hereinabove described, it would be size such that the collector 10 will efficiently and effectly treat 3,000 cfm of inlet air of which 1,000 cfm may be recirculated via outlet 50 and counduit 54 so that the particulate material cleaner and concentrator will effective handle 2,000 cfm of dirty air from, for example, a factory or the like.

Referring again to FIG. 6, a second concentrated particle skimming mechanism is provided in the helix 22 in conjunction with the outlet tube 24. The air stream is caused to swirl in the helix 22 and spiral downwardly as indicated by directional arrow C and, in so doing, particles suspended in the air are caused to move toward the inner walls of the cylindrical body 12 and the conical outlet duct 14 to issue as a concentrated particulate stream as indicated by arrow D. The cleaner air reverses direction, again as illustrated by directional arrow C, and flows upwardly through the outlet tube 24 into the volute or scroll 28. While much of the helical motion of the air stream is dissipated in the main body 12 and the cone 14, there is still helical motion of the gas stream in the outlet tube 24. This helical motion again causes any partuculate materials retained in the gas stream to be moved by centrifugal force to the inner wall 60 of the outlet tube 24. This concentration of particulate material would, under normal conditions, flow into the outlet volute 28. However, by provisions of the adjustable gate 62 in a portion of the wall of the outlet tube 24 acts as a skimmer for the concentrated particles which issue therefrom, together with a portion of the outlet air as indicated by directional arrow E. The removal of the concentrated particles and a portion of the air in the outlet tube 24 is caused by the venturi action of air in the inlet helix creating a low pressure zone between the interior of the outlet tube and the adjustable lip 62. The portion of the air stream removed at the venturi opening into the helix 22 may be adjusted by varying the width of the opening of the gate 62 via adjusting threads generally designated 68 which may comprise a system such as disclosed in respect to the skimmer plate 32 in the outlet volute 28.

With a collector size to properly handle 3,000 cfm and with both of the skimmers 62 and 32 functioning efficiently and effectively, air flow to the inlet 20 may be 2,000 cfm and the additional 1,000 cfm being injected into the air stream via conduit 54 and the venturi action at adjustable gate 62 with each of the two skimmers providing, for example, about 500 cfm's.

Tests have established that with a system such as hereinabove described, the air issuing from conduit 52 has a smaller particle concentration than normal ambient air at sea level.

In order to increase the efficiency of the skimming effect at the outlet tube 24 and the inlet volute 22, an additional swirling motion may be imparted to the air stream as it enters the outlet tube 24 by the spirally formed plate generally designated 70 positioned to extend from the lower end 72 of the outlet tube 24 into the cylindrical housing 12. The additional helical motion imparted to the air by the spirally formed air whirling means 70 causes a greater degree of particles to concentrate along the inner wall 60 of the outlet tube 24.

Agglomeration of particulates in the outlet tube 24 and the upper volute may also be improved by lining these elements with a plastic liner 74. It has been discovered that the use of a plastic liner will cause particulates to agglomerate and such liner reduces reentrainment of the particles so that a greater percentage may be skimmed and reintroduced into the incoming dirty air stream via the skimmer 62. A suitable plastic, or plastics, for liner purposes may comprise vinyl chloride and the acrylic resins.

From the foregoing description it will be seen that novel cyclone vortex type air cleaner and particulate concentrator is provided. It will be recognized by those skilled in the art that various modifications may be made in the form and construction of the collector without departing from the scope of the appended claims, for example, the dirty vortex air issuing from conduit 50 to the top scroll or volute 28 may be connected to a pipe such as the outlet pipe 16' at the bottom of the cone 14 and such air would then be used to transport the particulate material to storage bins or for further treatment-as the case may be.

It will be further recognized by those skilled in the art that as little as 20% to as much as 50% of the air flow capacity of the air particulate concentrator and collector may be recirculated air from the skimmers in the inlet and outlet volutes, and that of the recirculated air from about 20% to about 75% may be skimmed air from the outlet volute and the remainder air skimmed from the outlet tube.

STATEMENT OF INDUSTRIAL APPLICATION

An improved cyclone-type air or gas cleaner, and particulate concentrator is provided which will clean air from a woodworking furniture factory, for example, to a degree which will permit recirculation of a portion of the dirty air stream, thereby reducing heating and cooling requirements of the factory.

We claim:

1. A cyclone-type particulate collector and concentrator comprising:
    a cylindrical body portion having a conical lower particulate material outlet tube;
    a dirty gas inlet volute at the upper end of the cylindrical body portion;
    a gas outlet tube, said gas outlet tube having a lower end projecting through the inlet volute and terminating in the cylindrical body portion and an open upper end;
    an outlet volute communicating with the upper end of the gas outlet tube;
    an adjustable passage between the gas outlet tube and the dirty gas inlet volute; and
    an adjustable skimmer plate pivotally mounted in the gas outlet volute and so positioned to separate the outlet gas stream into two streams differing in suspended particle concentration.

2. The cyclone-type particulate collector and concentrator as defined in claim 1 wherein the adjustable passage between the gas outlet tube and the dirty gas inlet tube returns a fraction of the air stream in the outlet tube to the dirty gas inlet for reprocessing in the particulate collector and concentrator.

3. The cyclone-type particulate collector and concentrator as defined in claim 2 wherein the gas stream having the greatest concentration of suspended particulate material issuing from the gas outlet volute is returned to the dirty gas inlet to the particulate collector and concentrator.

4. The particulate collector and concentrator as defined in claim 3 further including a plastic liner for the gas outlet tube.

* * * * *